United States Patent [19]

Kochik et al.

[11] Patent Number: 5,554,298

[45] Date of Patent: Sep. 10, 1996

[54] STEEL MILL FLUME WATER TREATMENT

[75] Inventors: Ronald D. Kochik, Batavia; David A. Picco, Shorewood, both of Ill.; Michael L. Braden, Sugar Land, Tex.; Kristine S. Salmen, Naperville, Ill.

[73] Assignee: Nalco Chemical Company, Naperville, Ill.

[21] Appl. No.: 376,729

[22] Filed: Jan. 20, 1995

[51] Int. Cl.$^6$ .................................................. B01D 17/05
[52] U.S. Cl. ...................... 210/708; 72/39; 134/25.1; 134/40; 210/734; 210/735; 210/736
[58] Field of Search .................... 134/25.1, 13, 40; 72/39; 210/708, 725, 727, 728, 734, 735, 736

[56] References Cited

U.S. PATENT DOCUMENTS

| | | | |
|---|---|---|---|
| 3,345,841 | 10/1967 | Phelan et al. ........................... | 210/732 |
| 4,588,508 | 5/1986 | Allenson et al. ......................... | 210/708 |
| 4,715,962 | 12/1987 | Bhattacharyya et al. ................ | 210/708 |
| 4,995,912 | 2/1991 | Goss et al. .................................. | 134/2 |
| 5,015,391 | 5/1991 | Mohn ...................................... | 210/708 |
| 5,332,507 | 7/1994 | Braden et al. ........................... | 210/734 |

*Primary Examiner*—Peter A. Hruskoci
*Attorney, Agent, or Firm*—James J. Drake; Robert A. Miller

[57] ABSTRACT

The invention comprises a method of preventing deposition of oil on steel mill scale particles comprising adding from about 1 part per million to about 500 parts per million of an amine acrylate/acrylic acid copolymer to mill flume water. Once the copolymer is added, deposition of oil onto scale particles is prevented. The recovered mill scale has less than 2% oil by weight on the scale, making it suitable for recycle to the steelmaking process. Oil and water are subsequently separated with a greater percentage of oil being recovered.

7 Claims, 3 Drawing Sheets

STEEL MILL FLUME WATER TREATMENT

BACKGROUND OF THE INVENTION

1. Field of the Invention

The invention relates to a method of preventing deposition of oil on steel mill scale particles, and, more particularly, to a method of preventing deposition of oil by chemical treatment in steel mill flume water.

2. Description of the Prior Art

Oily mill scale presents a tremendous waste handling problem for the steel industry due to the vast tonnage of mill scale produced at each hot rolling mill location. A cost-effective incineration process to burn off the oil is prohibited under a number of federal regulations (i.e., blue smoke, hydrocarbon release). Currently, there are no chemical or mechanical programs that remove the oil from the mill scale with reasonable cost to the steel industry.

In a typical hot rolling mill, as shown in FIG. 1, the steel ingot is rolled for shaping and thinning, and water is sprayed onto the steel to cool it and to knock off the iron oxide scale that forms as oxygen reacts with the steel surface. This mill scale falls through a grating below the steel stands and into a flume where water is collected. A variety of oils, greases, and hydraulic fluids (hereafter called oil) utilized for lubrication of mechanical equipment also drop into the flume water. The mill scale is carded in the flowing water in the flume to a scale pit where the oil, scale, and water are separated. However, the mill scale is now oil-wet as a result of contact with the oil in the flume water trench and scale pit. In some cases, mill scale may contain up to 10% oil.

Steel mills consider the recycling of mill scale highly desirable, since mill scale provides higher iron content than iron ore. However, there are problems with direct use of oily mill scale in the steelmaking process. In typical operations, iron ore and other particulate iron sources such as mill scale are agglomerated in a sintering process to reduce air emissions of particulates from the blast furnace. Agglomeration is accomplished in the sinter plant by exposing the iron-containing feed to elevated temperatures, so that the particles fuse together to form agglomerates. The oily mill scale is thus exposed to a temperature gradient, resulting in some vaporization of the oil and release to the off gases. There is concern over hydrocarbon (oil) emissions from the sinter plant because of the need to comply with various air pollution regulations. Oily mill scale can also cause processing problems in the sinter plant, such as fouling of air filters in the "baghouse" and, in extreme cases, back-fires in the furnaces.

Therefore, there is a limit on the amount of oil that can be tolerated in the sintering operation. The limit for oil on mill scale is site specific, depending on local regulations and on other hydrocarbon emissions from within the mill and also on the amount of oily mill scale that is being processed. In some mills, oil content of mill scale must be less than 1%, while other mills may utilize mill scale with 2% or more oil. In general, however, reduced oil content mill scale may allow the steel mill to recycle more oily mill scale daily, reducing the amount of iron ore being purchased.

A cost-effective incineration process to burn off the oil from the mill scale is prohibited under a number of federal air pollution regulations (i.e., blue smoke, hydrocarbon release). Currently, there are a number of chemical or mechanical processes to remove the oil from the mill scale, but these processes suffer from high capital and operating costs. In a mill producing 100,000 tons of oily mill scale per year, annual costs for oil removal would be over $1,000,000.

SUMMARY OF THE INVENTION

The invention comprises a method of preventing deposition of oil on steel mill scale particles comprising adding from about 1 part per million to about 500 parts per million of an amine acrylate/acrylic acid copolymer to mill flume water. Once the copolymer is added, deposition of oil onto the scale is prevented. Oil and water are subsequently separated in the scale pit with a greater percentage of oil being recovered in a floating layer.

DESCRIPTION OF THE PREFERRED EMBODIMENTS

Figure 1:
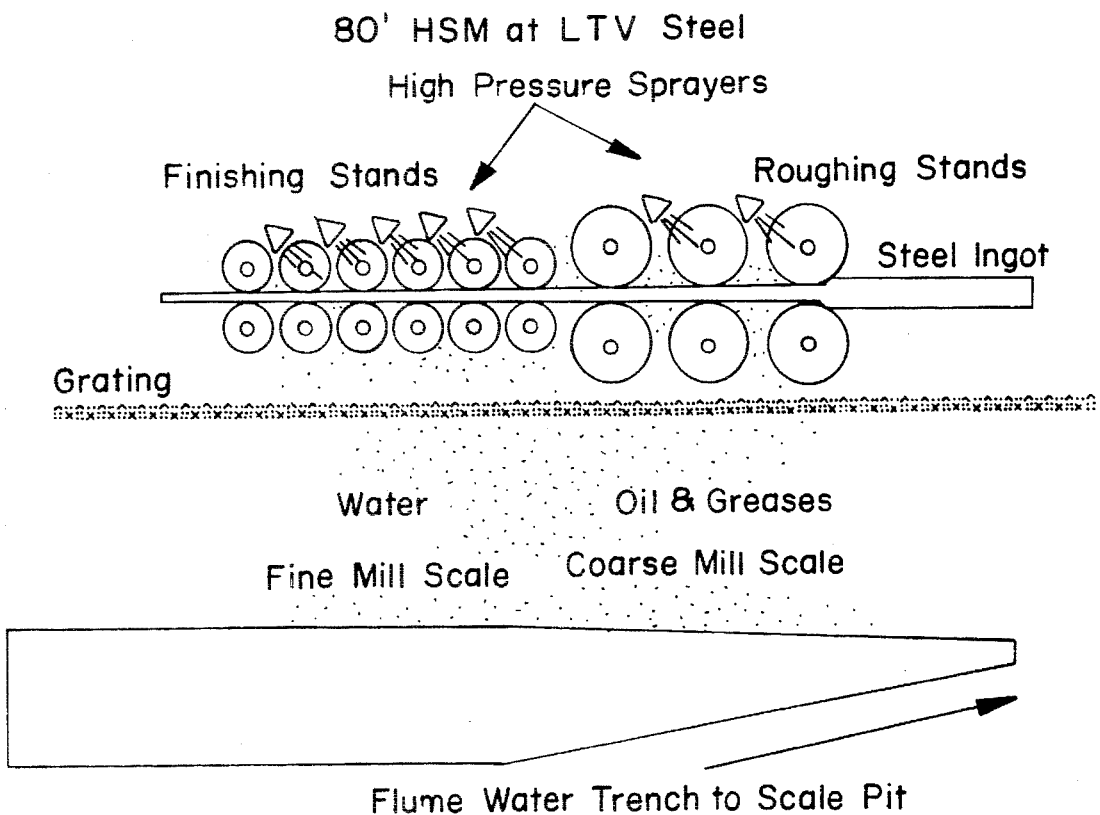
FIG. 1 is a diagram of a typical hot rolling mill system.
Figure 1:
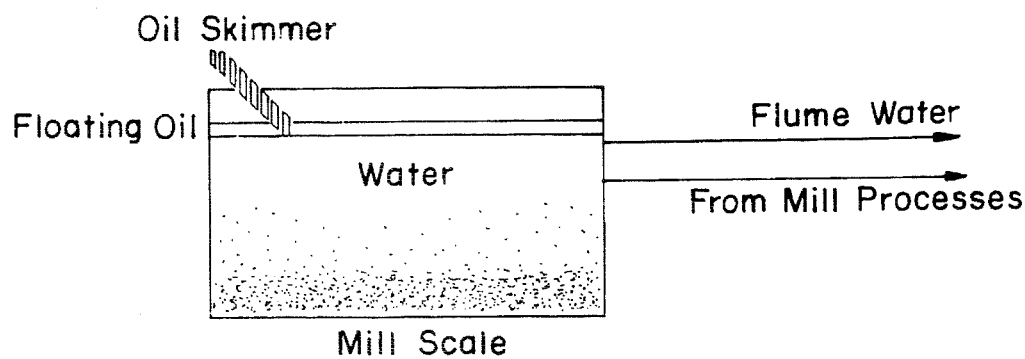

A method of preventing deposition of oil on steel mill scale particles is claimed. The method comprises adding to mill water a copolymer of an amine acrylate and acrylic acid. The copolymer has a molar ratio of from about 90:10 to about 40:60 of amine acrylate to acrylic acid. Once the copolymer has been added to the mill water, the water, as part of the normal mill process, is subjected to mixing as it flows to the scale pit.

Preferably, the mill water is treated in the flume, ahead of the scale pit. Oil present in flume water is quickly absorbed onto mill scale. Accordingly, application of the chemical into the water before oil can contact the mill scale is vital to optimum oil deposition prevention. In the preferred embodiment of the invention, the polymer is added under the steel stands, just as the water falls into the flume.

The mill water is characterized as having a pH of from about 3.0 to about 9.0. Further, the temperature of the water is from about 20° C. to about 50° C.

Preferably, the amine acrylate used in the invention is selected from dimethylaminoethyl acrylate methyl chloride quaternary (DMAEA.MCQ), dimethylaminoethylmethacrylate (DMAEM), dimethylaminoethyl acrylate benzyl chloride quaternary (DMAEA.BCQ), dimethylaminoethylmethacrylate methyl chloride quaternary (DMAEM.MCQ), [3-methacryloylamino-propyl]trimethyl ammonium chloride (MAPTAC), dimethylaminoethylmethacrylate sulfuric acid salt and N-[3(Dimethylamino)propyl]-methacrylamide (DMAPMA).

In the preferred embodiment of the invention, the copolymer amphoteric copolymer is added at a dosage of from about 1 part per million to about 500 parts per million. More preferably, the amount of amphoteric copolymer added is from about 1 part per million to about 100 parts per million. Most preferably, the amount of amphoteric copolymer added is from about 5 part per million to about 50 parts per million. In the most preferred embodiment, an amphoteric copolymer of DMAEA-MCQ/Acrylic Acid at a 50:50 percent mole ratio has been determined to yield the best results.

An intrinsic viscosity (IV) of 0.8 to 3.0 dL/g is preferred for the copolymer of the invention. Products giving the best oil prevention are materials having the highest IVs and bulk viscosities. The amphoteric copolymer of the most preferred embodiment is characterized as having an intrinsic viscosity of from about 2.0 to about 3.0 dL/g.

Once the copolymer has been added to the mill water, a mixture is formed between the mill scale, water, oil, and the amphoteric copolymer. Mixing occurs by virtue of the flow of water to the scale pit. In one steel mill, the flow is from 35–60,000 gallons per minute (GPM). Preferably, the removed scale from the pit has no more than 2.0% weight percent of oil when recovered. More preferably, the removed scale has no more than 1.0% weight percent of oil when recovered.

Otter polymers used in the invention are selected from the group consisting of diallyldimethylammonium chloride/acrylic acid copolymer, polymeric diallyldimethylammonium chloride, DADMAC/Acrylic Acid copolymer, polymeric DADMAC, DMA/Epichlorohydrin copolymer, EDC/$NH_4$/NaOH, EDC/$NH_4$/MCQ, 93%/7% DADMAC/AMPS, 86%/14% DADMAC/AMBA, N, N-diallyl-N-methyltaurine, and diallyldicarboxymethylammonium chloride.

The following examples are presented to describe preferred embodiments and utilities of the invention and are not meant to limit the invention unless otherwise stated in the claims appended hereto.

EXAMPLE 1

A chemical evaluation scheme was developed to simulate the water/oil/scale mixing in a flume water system. The method used was as follows. A one gallon glass jar was filled with 1 liter(L) of tap water and 100 grams of oil-free mill scale. The treatment chemical was added, the jar was shaken several times, and four grams of recovered oil (previously extracted from oily mill scale) were injected into the mixture. The mixture was then shaken on an Eberbach shaker at a high setting for one minute. The jar rested for 5 minutes, and the oil was siphoned off the top. The jar was wiped with a paper towel to remove any free oil adhering to the sides above the water. The remaining water and mill scale were simultaneously poured off and filtered through a 200-mesh screen and then transferred to a stainless steel pan for drying at 105° C. overnight. The dried scale was transferred to a thimble, and the oil was extracted in a extractor using freon as the extractant. The resulting oil/freon extract was transferred to a volumetric flask, and the volume adjusted with additional freon. The concentration of oil in the extract was determined with standard analytical methodology by comparison to a calibration curve of mill oil/freon blends in an infrared (fit) spectrophotometer.

EXAMPLE 2

Two 5 gallon pails of mill scale material were obtained from a midwestern steel mill. A sample was taken from the scale pit area and appeared quite oily. Characterization of mill scale particle size was performed on this "high" oil (8.6%) scale sample. From past work, particles<100 mesh are considered "fines" and tend to hold most of the oil contamination due to high surface area. The high oil scale had 28.5% fines material. The high oil mill scale sample was used in subsequent oil deposition experiments.

Oil and mill scale contaminant levels for one steel mill were calculated from the following process data: water flow was 35–60,000 gallons per minute (GPM), oil & grease usage was 19,283 lbs/day and mill scale collection was 47,542 lbs/day. This calculates to flume water contaminate levels of 27 to 45 ppm of oil and 66 to 113 ppm of mill scale.

Initially, several polymer chemistries were tested on the bench to measure oil deposition prevention activity. None of the chemistries tested prevented oil deposition to less than one percent on the mill scale, though higher dosages, 2000 ppm, reduced the amount of oil on scale from 2.85% to 1.62%. Based on this information, a series of amphoteric copolymers of DMAEA.BCQ/Acrylic acid and DMAEA.MCQ/Acrylic acid were tested. These polymers had amine/acid mole ratios ranging from 90:10 to 40:60.

Figure 2:
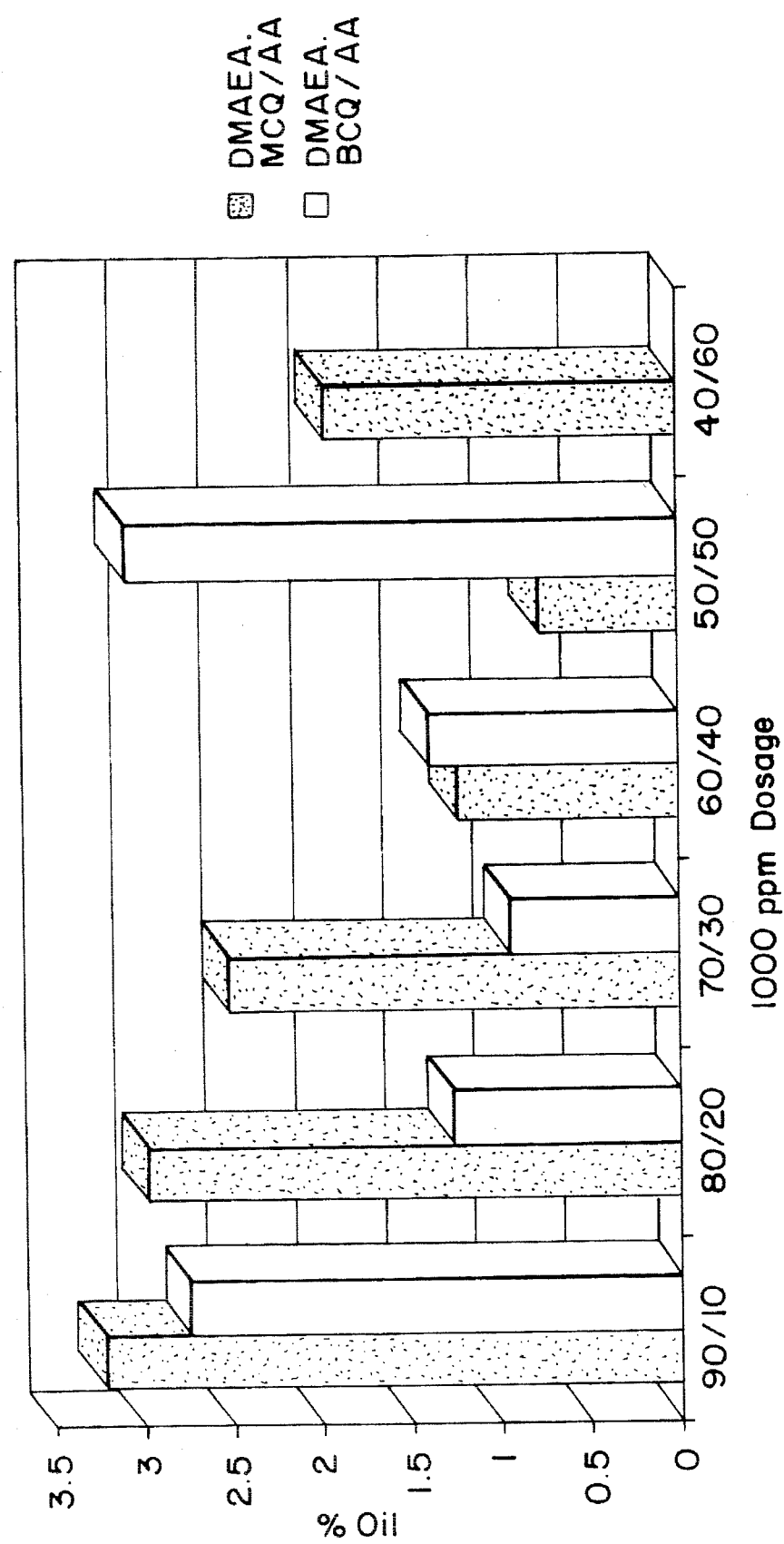
FIG. 2 is a graph comparing the efficacy of two different amphoteric copolymers for oil deposition prevention.

FIG. 2 shows the results of the amphoteric testing. Two chemicals, a 70:30 mole ratio of DMAEA.BCQ/Acrylic acid and a 50:50 mole ratio of DMAEA.MCQ/Acrylic acid, showed the best results. Repetitive testing showed that the DMAEA. MCQ copolymer gave lower % oil results than the DMAEA.BCQ polymer.

EXAMPLE 3

Figure 3:
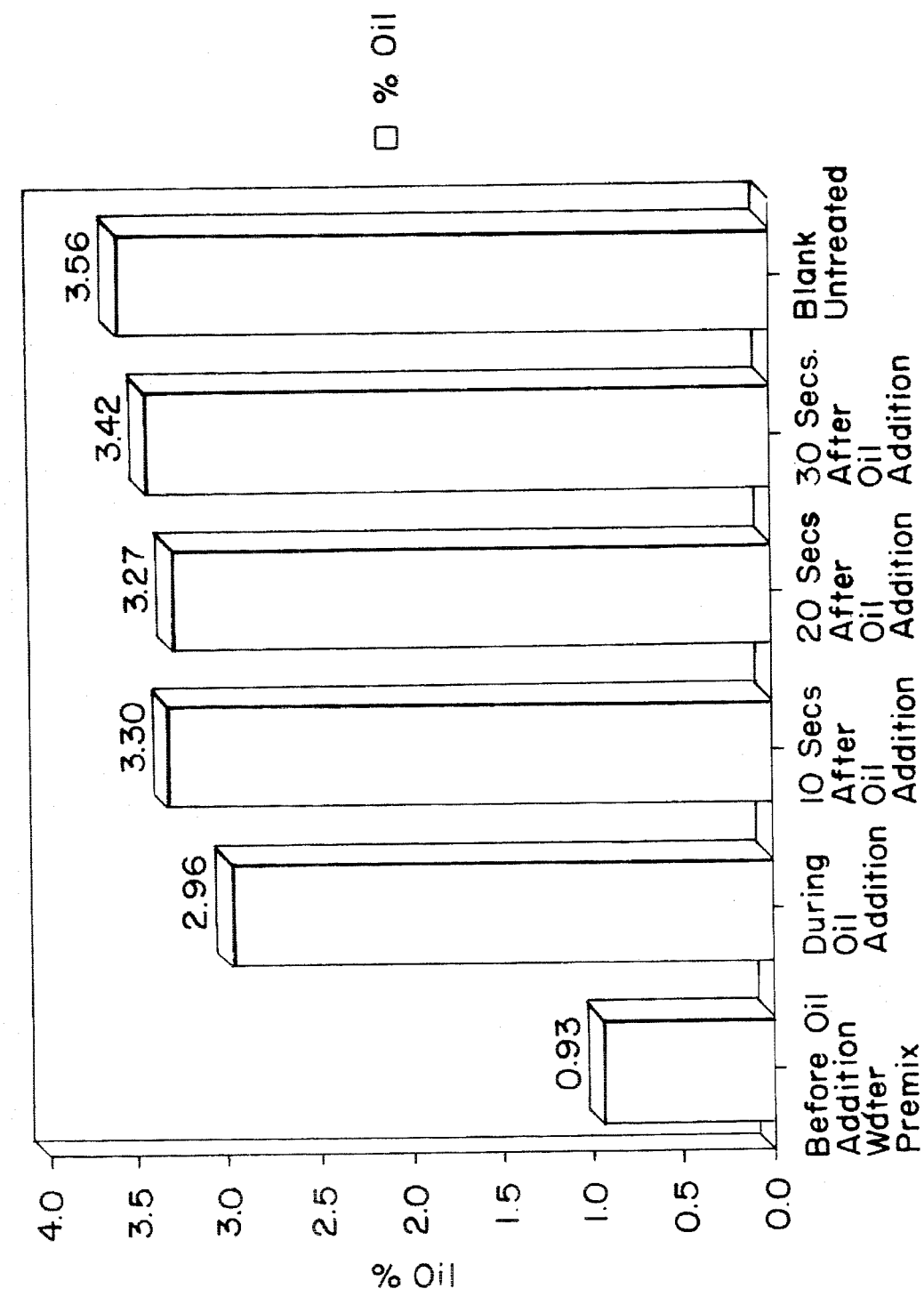
FIG. 3 is a graph comparing the effects of differing addition points on oil deposition prevention.

To examine any possible "point of addition" effects, an experiment was done where the point of chemical addition was changed. FIG. 3 shows the results with different sequencing of water, oil, and chemical addition to the jar prior to mixing. Adding the chemical to the water first has a greater impact on deposition prevention than did adding it after the oil had contacted the scale. Previous baseline contact time experiments have shown that oil deposits very quickly onto mill scale at a rate of 90% in 30 seconds. The chemical addition is ineffective at even 1,000 ppm in preventing deposition when all the oil, chemical and scale are added simultaneously. Allowing the oil to contact the mill scale first completely overwhelms any preventive effect that the polymer might have.

Furthermore, without chemical treatment, the water will contain emulsified oils. With the claimed chemical treatment, the oil quickly pops to the surface of the water after mixing stops. The water is very clear without a trace of emulsified oil. This improvement in oil release from the water is expected to be likewise seen in the scale pit where scale, water, and oil are separated in the steelmill. Thus, more oil can be recovered from the pit and either incinerated or recycled. Furthermore, the water recovered from the scale pit will be cleaner for reuse in contact cooling of the steel.

Changes can be made in the composition, operation and arrangement of the method of the present invention described herein without departing from the concept and scope of the invention as defined in the following claims:

We claim:

1. A method of preventing deposition of oil on steel mill scale particles comprising:

adding to mill flume water containing steel mill scale particles and oil an amphoteric copolymer of an amine acrylate and an acrylic acid having a molar ratio of from about 90:10 to about 40:60 of amine acrylate to acrylic acids, wherein said amine acrylate is selected from the group consisting of dimethylaminoethyl acrylate methyl chloride quaternary, dimethylaminoethyl acrylate benzyl chloride quaternary, dimethylaminoethyl methacrylate methyl chloride quaternary, and 3-methacryloylaminopropyl trimethyl ammonium chloride, wherein the amphoteric copolymer has an intrinsic viscosity of from about 0.8 to about 3.0 dL\g and wherein the amphoteric copolymer is added in an amount of from about 1 part per million to about 500 parts per million;

pumping the water to a scale pit, separating the scale particles from the flume water;

whereby the separated scale particles have an oil content less than 2.0% by weight of the particles.

2. The method of claim 1, wherein the amount of amphoteric copolymer added is from about 1 part per million to about 100 parts per million.

3. The method of claim 2, wherein the amount of amphoteric copolymer added is from about 5 part per million to about 50 parts per million.

4. The method of claim 1, wherein the amphoteric copolymer has an intrinsic viscosity of from about 2.0 to about 3.0 dL/g.

5. The method of claim 1, wherein the separated scale particles have an oil content less than 1.0% by weight of the particles.

6. The method of claim 1, wherein the copolymer is added to the mill flume water before the mill flume water flows into the scale pit.

7. The method of claim 6, wherein the polymer is added to the mill flume water after the water is used in steel stands.

* * * * *